(12) United States Patent
Wismann et al.

(10) Patent No.: US 12,151,770 B2
(45) Date of Patent: Nov. 26, 2024

(54) SWITCHGEAR FOR VEHICLE AND VEHICLE INCLUDING SWITCHGEAR

(71) Applicant: Zero Motorcycles, Inc., Scotts Valley, CA (US)

(72) Inventors: Brian J. Wismann, Felton, CA (US); Stephanie Owyang, Redwood City, CA (US); Will Brunner, Scotts Valley, CA (US)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 203 days.

(21) Appl. No.: 17/559,285

(22) Filed: Dec. 22, 2021

(65) Prior Publication Data

US 2023/0192227 A1 Jun. 22, 2023

(51) Int. Cl.
*B60Q 1/00* (2006.01)
*B62K 21/12* (2006.01)
*B62K 23/04* (2006.01)

(52) U.S. Cl.
CPC .............. *B62K 23/04* (2013.01); *B62K 21/12* (2013.01); *B62K 2204/00* (2013.01)

(58) Field of Classification Search
CPC .... B62K 23/04; B62K 21/12; B62K 2204/00; B62K 23/02; B62K 11/14
USPC ........................................................ 340/438
See application file for complete search history.

(56) References Cited

U.S. PATENT DOCUMENTS

| | | | |
|---|---|---|---|
| 6,081,190 A | 6/2000 | Kellermann | |
| 8,248,270 B2 * | 8/2012 | Nieves | B60Q 9/00 340/936 |
| 9,483,133 B2 | 11/2016 | Gondo | |
| 9,499,230 B1 * | 11/2016 | Russ | B62J 6/16 |
| 9,573,646 B2 | 2/2017 | Lloyd et al. | |
| 9,802,537 B2 | 10/2017 | Tetsuka et al. | |
| 9,908,370 B2 | 3/2018 | Sweney et al. | |
| 10,377,308 B2 | 8/2019 | Savaresi et al. | |
| 11,077,865 B2 | 8/2021 | Schwabe et al. | |
| 2014/0070930 A1 | 3/2014 | Hara | |
| 2015/0100204 A1 | 4/2015 | Gondo | |
| 2015/0307022 A1 * | 10/2015 | Nelson | B62D 1/046 701/36 |

(Continued)

FOREIGN PATENT DOCUMENTS

| | | |
|---|---|---|
| DE | 102017209374 A1 | 12/2018 |
| WO | 2011/035350 A2 | 3/2011 |
| WO | 2019046945 A1 | 3/2019 |

OTHER PUBLICATIONS

International Search Report and Written Opinion issued in corresponding International Application No. PCT/US2022/053589, dated Mar. 22, 2023, pp. 1-10.

(Continued)

*Primary Examiner* — Tai T Nguyen
(74) *Attorney, Agent, or Firm* — Carter, DeLuca & Farrell LLP (57) ABSTRACT

A vehicle having an electric drivetrain, e.g., an electric motorcycle, includes a handlebar and switchgear(s) mounted on the handlebar. Vibration generation device(s) are provided in the switchgear(s) and transmit vibrations to the handlebar via the switchgear. The vibrations may be sensed by the driver or operator of the vehicle and provide to the driver or operator of the vehicle feedback or other information relating to the vehicle or its operation.

23 Claims, 11 Drawing Sheets

(56) References Cited

U.S. PATENT DOCUMENTS

| | | |
|---|---|---|
| 2016/0339986 A1* | 11/2016 | Jordan .................. G08C 17/02 |
| 2018/0065551 A1 | 3/2018 | Sweney et al. |
| 2020/0216136 A1 | 7/2020 | Hara et al. |
| 2020/0269868 A1 | 8/2020 | Giraud |
| 2020/0298809 A1 | 9/2020 | Todeschini |
| 2020/0346706 A1 | 11/2020 | Isenschmid |

OTHER PUBLICATIONS

"Wunderlich Handlebar Switchgear Set." Eurotune. (Accessed Aug. 27, 2021), pp. 1-3.

Beeler, Jensen. "The Next, Next Big Thing: Haptic Feedback." Asphalt & Rubber. Apr. 27, 2016. (Accessed Aug. 27, 2021), pp. 1-18.

International Report on Patentability issued in corresponding International Application No. PCT/US2022/053589, dated Jun. 20, 2024, pp. 1-7.

* cited by examiner

SWITCHGEAR FOR VEHICLE AND VEHICLE INCLUDING SWITCHGEAR

FIELD OF THE INVENTION

The present invention relates to a switchgear for a vehicle and to a vehicle including the switchgear.

BACKGROUND INFORMATION

Vehicles that include electric drivetrains operate with less noise and vibration than their counterparts that include internal combustion engines. On the one hand, quieter and smoother operation of electric vehicles reduce noise pollution, rider fatigue, negative effects on hearing, but, on the other hand, drivers may experience less feedback from the vehicle as to its operation. For example, a driver of a motorcycle that includes a multi-gear transmission and an internal combustion engine may intuit that they should shift to a higher gear based on audible and tactile clues from the engine without necessarily looking at the vehicle's tachometer.

It would be beneficial to utilize the reduced noise and vibration during operation of a vehicle having an electric drivetrain to provide feedback and other information to the driver or operator of the vehicle.

SUMMARY

According to an example embodiment of the present invention, a switchgear for a vehicle includes: a housing delimiting an internal space; a control device manually operable by an operator of the vehicle, provided on the housing, and adapted to control a corresponding component of the vehicle external to and spaced apart from the housing; a vibration generation device arranged inside the internal space of the housing and adapted to generate vibrations according to a predetermined pattern associated with the corresponding component of the vehicle external to and spaced apart from the housing; and a clamp device adapted to clamp the housing to a handlebar of the vehicle, the vibration generation device being mechanically coupled to the clamp device and adapted to transmit the generated vibrations to the clamp device, the clamp device adapted to transmit, to the handlebar, the vibrations generated by the vibration generation device and transmitted to the clamp device.

The clamp device may be adapted to clamp the housing directly to the handlebar.

The control device may include a plurality of control devices, and each control device may be adapted to control a corresponding component of the vehicle external to and spaced apart from the housing.

The vibration generation device may be directly coupled to the clamp device without any vibration damping or vibration isolation device between the vibration generation device and the clamp device.

The vibration generation device may be adapted to generate vibrations according to a plurality of predetermined patterns, and each predetermined pattern being associated with a respective one of the plurality of control devices.

The vibration generation device may include an eccentric rotating mass and/or a piezoelectric vibration generation device.

The control device may include a switch, a momentary switch, a turn signal switch, a headlight switch, a brake lever, and/or an accelerator.

The vehicle may include an electric drivetrain.

According to an example embodiment of the present invention, a vehicle includes a handlebar and a switchgear mounted to the handlebar. The switchgear includes: a housing delimiting an internal space; a control device manually operable by an operator of the vehicle, provided on the housing, and adapted to control a corresponding component of the vehicle external to and spaced apart from the housing; a vibration generation device arranged inside the internal space of the housing and adapted to generate vibrations according to a predetermined pattern associated with the corresponding component of the vehicle external to and spaced apart from the housing; and a clamp device clamping the housing to the handlebar, the vibration generation device being mechanically coupled to the clamp device and adapted to transmit the generated vibrations to the clamp device, the clamp device adapted to transmit, to the handlebar, the vibrations generated by the vibration generation device and transmitted to the clamp device.

The switchgear of the vehicle may include any of the features mentioned above, either individually or in any combination thereof.

The vehicle may include a first switchgear arranged on a first lateral side of the handlebar and a second switchgear arranged on a second lateral side of the handlebar.

Further features and aspects of example embodiments of the present invention are described in more detail below with reference to the appended schematic Figures.

DETAILED DESCRIPTION

Figure 1:
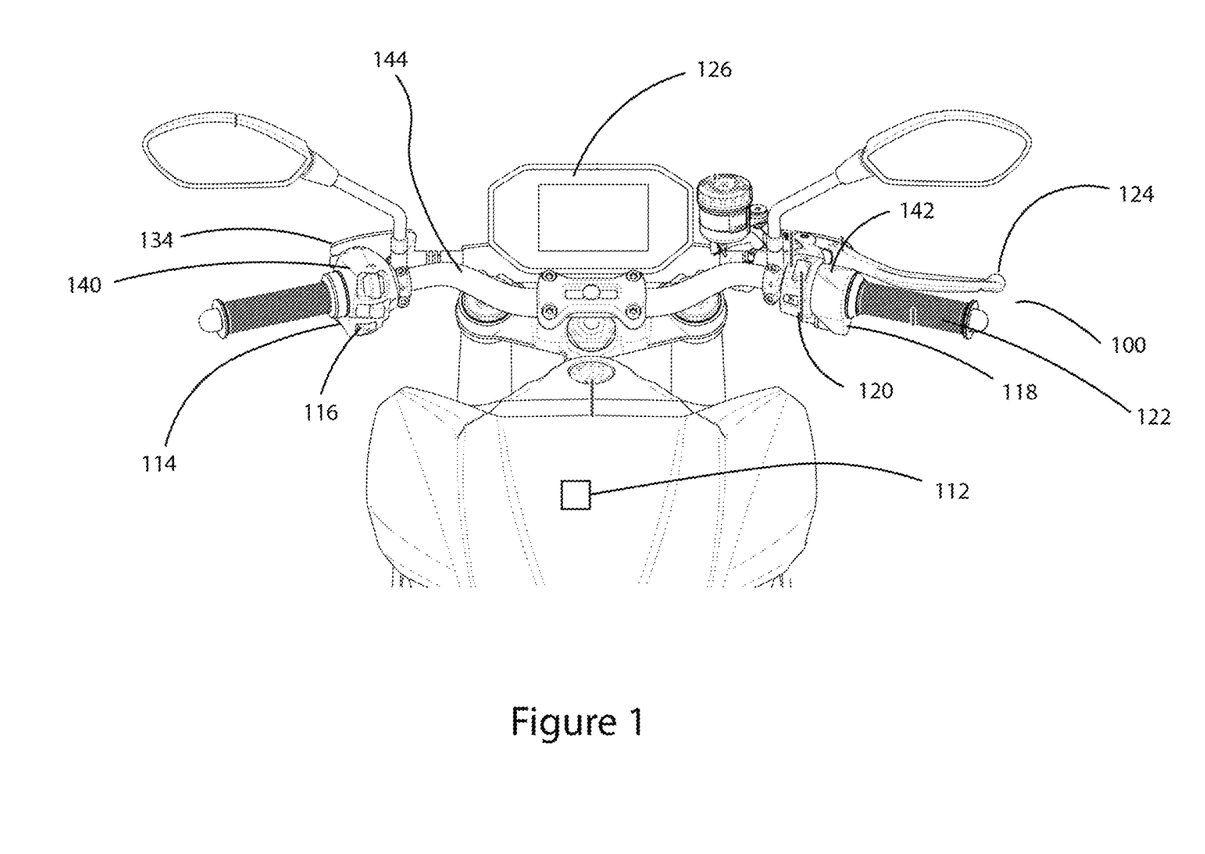
FIG. 1 is a schematic top view of a vehicle according to an example embodiment of the present invention.
Figure 2:
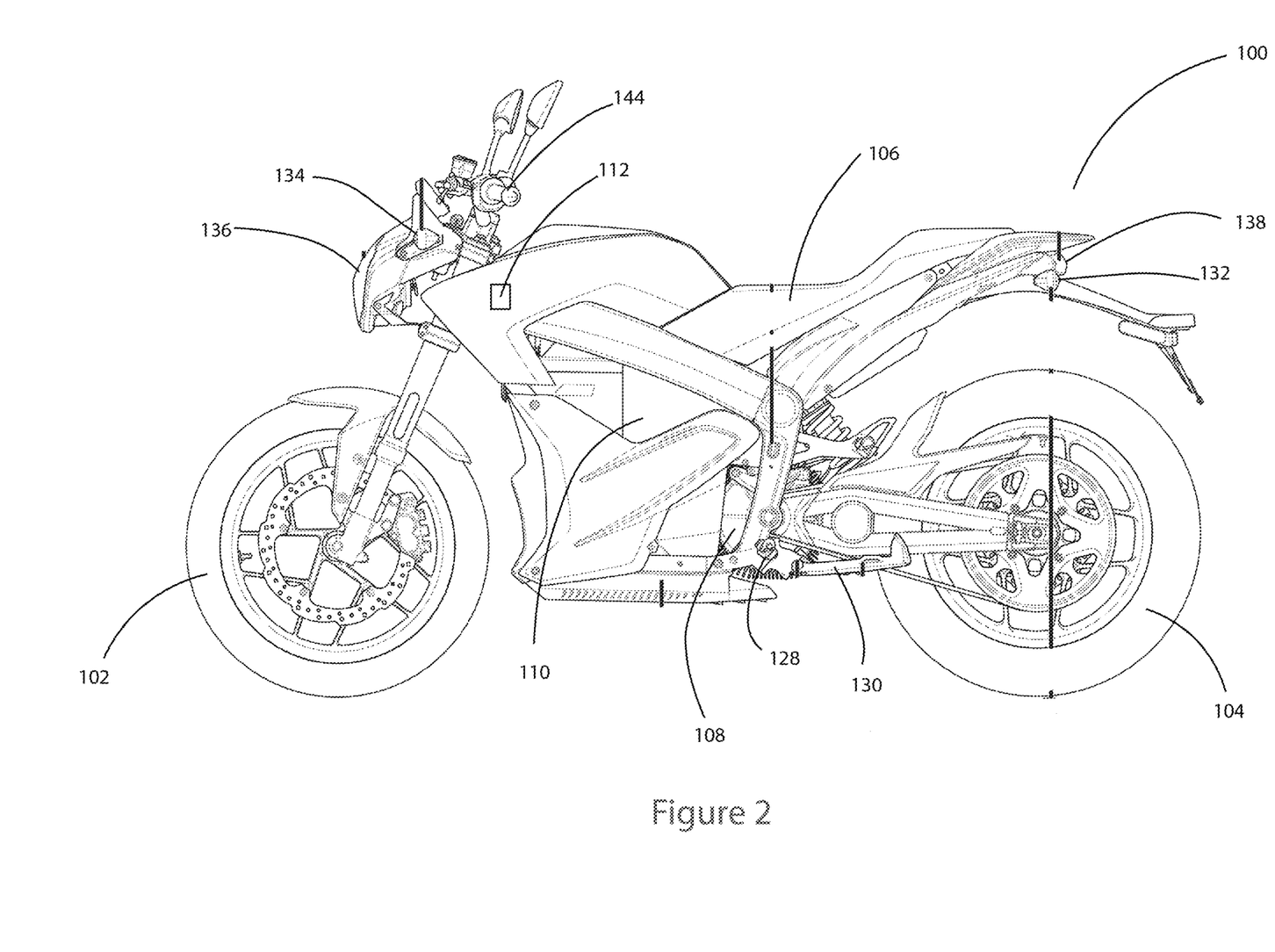
FIG. 2 is a schematic side view of the vehicle.

FIG. 1 is a schematic top view of a vehicle 100 according to an example embodiment of the present invention, and FIG. 2 is a schematic side view of vehicle 100. As illustrated in FIG. 1, the vehicle 100 may be arranged as a two-wheeled vehicle, e.g., a motorcycle, and may be arranged as a hybrid vehicle, an electric vehicle (EV), a plug in hybrid electric vehicle (PHEV), etc. Vehicle 100 includes, for example, a front wheel 102, a rear wheel 104, and a seat 106 to accommodate a driver and, optionally, a passenger, thereon. The rear wheel 104 is driven by an electric motor 108 via a belt, chain, driveshaft, etc., and the electric motor 108 is powered by an energy storage device 110, e.g., a battery, a rechargeable battery, a lithium-ion battery, etc. The vehicle 100 includes a controller 112, which may be arranged as a single integrated unit, e.g., electronic control unit (ECU), or may include a plurality of units, e.g., ECUs, distributed throughout the vehicle 100. The controller 112 may include one or more processors, CPUs, etc., and one or more memory units storing, for example, software instructions, data, etc. The memory may be arranged as a non-transitory memory that stores a set of instructions that are executable by the processor(s), CPU(s), etc., to control various aspects, functions, components, etc., of the vehicle 100 under the control of, for example, the driver or operator of the vehicle 100.

The vehicle 100 includes, for example, a handlebar 144 to steer the front wheel 102 to thereby determine the driving direction of the vehicle 100. Mounted on the handlebar 144 are, for example, left-hand switchgear 114 located on the left-hand side of the handlebar 144, right-hand switchgear 118 mounted on the right-hand side of the handlebar 144, display 126 centrally mounted on the handlebar 144. The left-hand switchgear 114 includes at least one, e.g., a plurality, of control devices 116, arranged, for example, as switches, push-buttons, sliders, touch-sensitive devices, etc., and the right-hand switchgear 118 includes at least one, e.g., a plurality of control devices 120, arranged, for example, as switches, push-buttons, sliders, touch-sensitive devices, etc. Control device 116, 120 are arranged to control respective components, systems, subsystems, devices, functions, and/or combinations thereof, of vehicle 100.

For example, the control devices 116 of the left-hand switchgear 114 may include: a headlight high/low beam switch, which, when pushed or pressed by the operator of the vehicle 100, causes the headlight 136 of vehicle 100 to change from low beam operation to high beam operation and remain in the high beam operation until switched back to low beam operation; a flash-to-pass switch, which, when pushed or pressed by the operator of the vehicle 100, causes the headlight 136 in the low beam operation to illuminate in the high beam operation and remain illuminated in the high beam illumination until the switch is released, in which case, operation of the headlight 136 returns to the low beam operation; a hazard warning flasher switch, which, when switched to the ON position, causes the front turn signals 132 and rear turn signals 134 of the vehicle 100 to flash, e.g., as a warning to other drivers, passengers, pedestrians, etc., of, for example, an emergency situation, and, when switched to the OFF position, causes the turn signals 132, 134 to stop flashing; a turn signal switch, which, when pushed to the left causes left-hand front turn signal 132 and left-hand rear turn signal 134 to flash, when pushed to the right causes right-hand front turn signal 132 and right-hand rear turn signal 134 to flash, and, when moved to its center or neutral position causes turn signals 132, 134 to stop flashing; horn button, which, while pushed or pressed by the operator of the vehicle 100 causes the horn of vehicle 100 to sound; etc.

For example, the control devices 120 of the right-hand switchgear 118 may include: a front brake lever 124, which controls the front brake of the vehicle 100; a throttle control/accelerator 122, which, when twisted, energizes the motor 108 to propel the vehicle 100 and which, when released, causes regenerative braking; a motor start-stop switch, which, in a first position, e.g., a STOP position, cuts power to the motor 108, e.g., operates as a kill switch, and in a second position, e.g., a RUN position, permits operation of the motor 108 to propel the vehicle 100; a mode button, which, when operated by the driver or the vehicle 100, toggles between or among multiple operating or performance modes of vehicle 100, e.g., economy (e.g., reduced acceleration and top speed, increased regenerative braking, soft acceleration, extended range, etc.), sport (e.g., higher acceleration and top speed, etc.), custom (e.g., customized performance settings set by the driver), etc., modes.

It should be appreciated that at least one of the control devices 116 of the left-hand switchgear 114 and/or at least one of the control devices 120 of the right-hand switchgear 118 controls aspects, components, systems, subsystems, devices, functions, and/or combinations thereof, of vehicle 100 that are located separate, apart, and/or outside of switchgear 114, 118, such as, for example, front brake operated by front brake lever 124 of right-hand switchgear 118, turn signals 132, 134 operated by turn signal switch of left-hand switchgear 114, etc.

Arranged inside of left-hand switchgear 114 is a vibration generation device 140, and/or arranged inside of right-hand switchgear 118 is a vibration generation device 142. The vibration generation device(s) 140, 142 may be arranged inside of a watertight housing or portion thereof of switchgears 114, 118 and are adapted to generate vibrations and are coupled to the handlebar 144, e.g., directly, indirectly, etc., so that vibrations generated by the vibration generation device(s) 140, 142 are transmitted to the handlebar 144 and to the driver or operator of vehicle 100. For example, the vibration generation device(s) 140, 142 may be connected directly to the clamp of the switchgear 114, 118 that clamps or mounts the switchgear directly to the handlebar 144 to minimize the path of transmission of vibrations from the vibration generation device(s) to the handlebar 144 and to the driver or operator of the vehicle 100. The coupling between the vibration generation device(s) 140, 142, the switchgear(s) 114, 118, and the handlebar 144 may exclude any form of vibration damping or isolation, to maximize transmission of vibrations from the vibration generation device(s) 140, 142 to the handlebar 144. Thus, the driver or operator of vehicle 100 may tactilely sense vibrations generated by the vibration generation device(s) 140, 142 and receive feedback, signals, warnings, messages, alerts, etc., as to operation of vehicle 100. The vibration generator device(s) 140, 142 may be arranged in the switchgear(s) 114, 118 as close to the respective hand grips of handlebar 144 as possible to achieve a high, or highest, transmission of vibrations and/or resolution to the driver or operator of vehicle 100.

Figure 3:
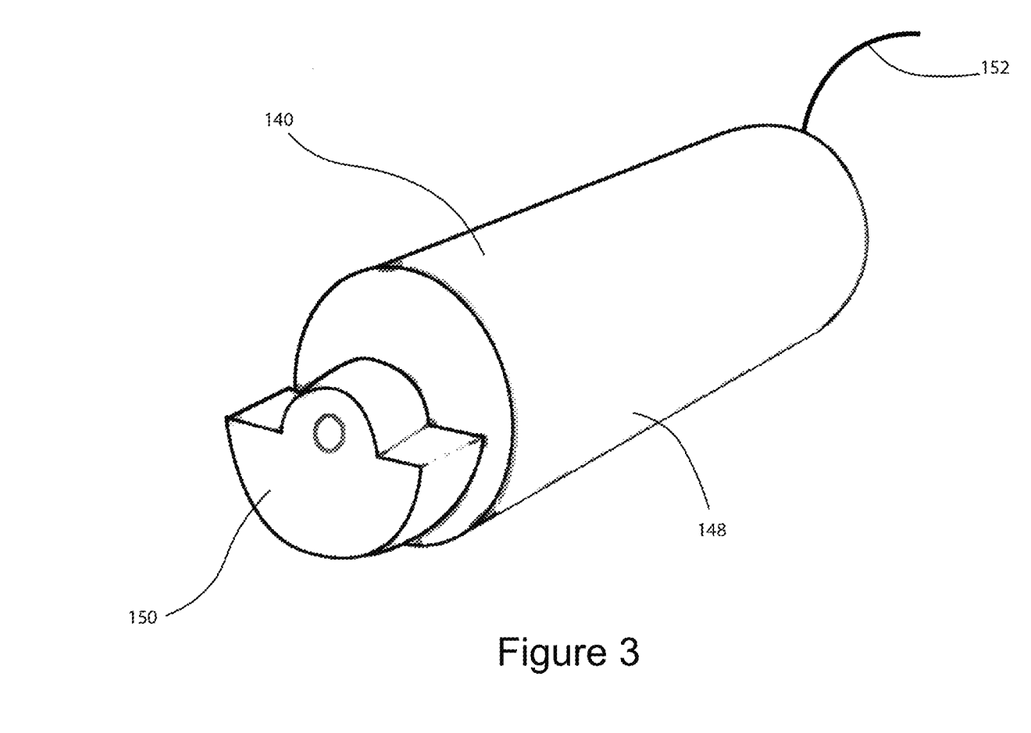
FIG. 3 is a schematic perspective view of a vibration generation device included in a switchgear of the vehicle.

As schematically illustrated, for example, in FIG. 3, vibration generation device 140 (and/or vibration generation device 142) may be arranged as and/or may include an eccentric rotating mass (ERM) vibration motor. The ERM vibration motor includes, for example, a motor 148 and an eccentric rotating mass 150, which, when rotated by motor 148, causes vibrations due to the eccentric rotating mass 150 being unbalanced, e.g., eccentric, with respect to the axis of rotation of the motor 148. The controller 112 communicates and/or provides power to motor 148 via line(s) 152. Additionally and/or alternatively, vibration generation device(s) 140, 142 may be arranged as and/or may include piezoelectric vibration generator, linear resonant actuator (LRA or LRV), a servomotor, other haptic device, etc. While a number of vibration generation devices 140 are described herein, an ERM vibration motor may be particularly suitable for use in powersports vehicles, such as those described herein. In this regard, ERMs can generate vibrations in multiple axes, e.g., axes orthogonal to the rotational axis of the motor 148, as compared to, for example, an LRAs, which generate vibrations in a single axis. Additionally, ERMs are capable of generating higher amplitude vibrations as compared to, for example, LRAs, and over a greater range of frequencies than, for example, LRAs. Therefore, ERM vibration motors may provide vibrations of sufficient amplitude and/or frequency to overcome and/or exceed vibrations and other noise, e.g., road vibration and noise, experienced during operation of the vehicle. 100.

Figure 4A:
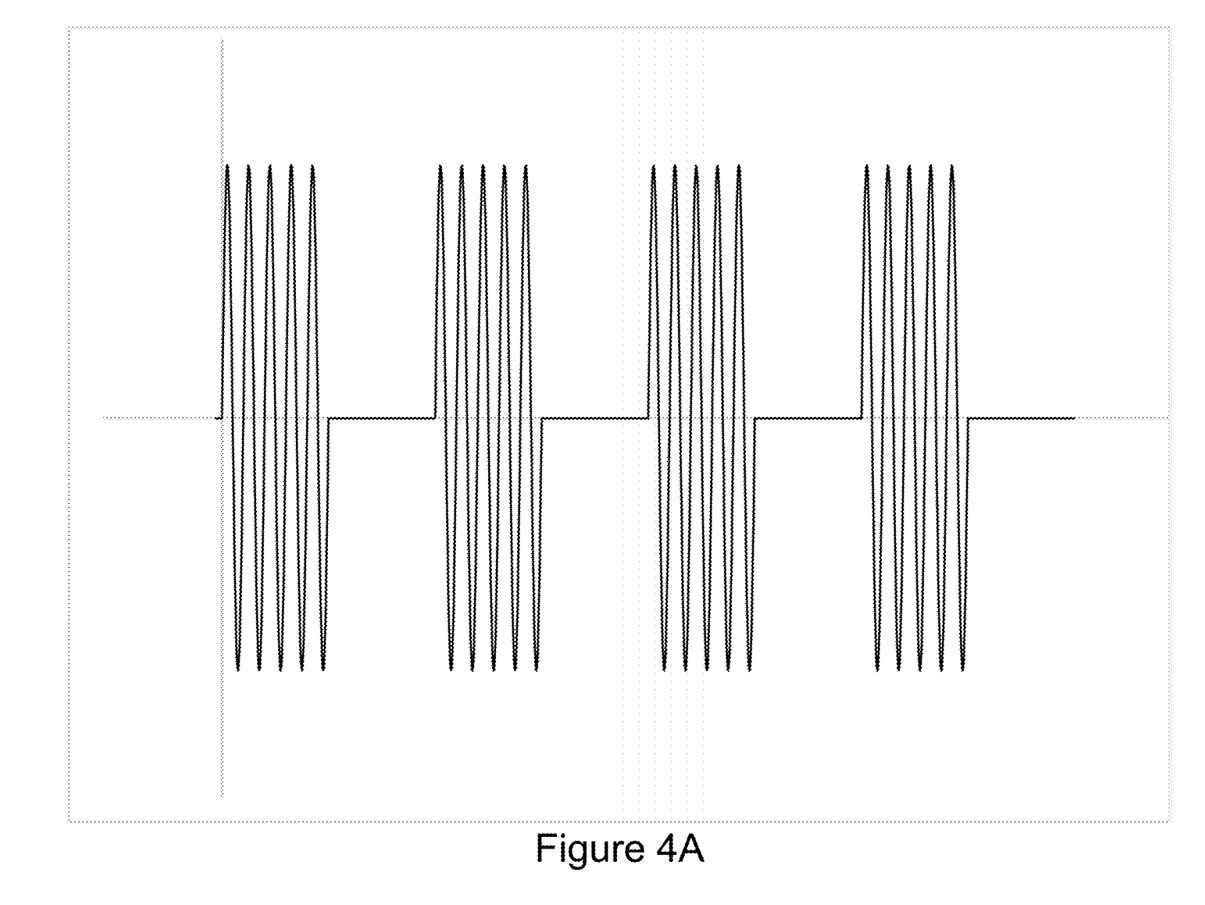
FIGS. 4A to 4F schematically illustrate exemplary haptic patterns associated with the vehicle.
Figure 4B:
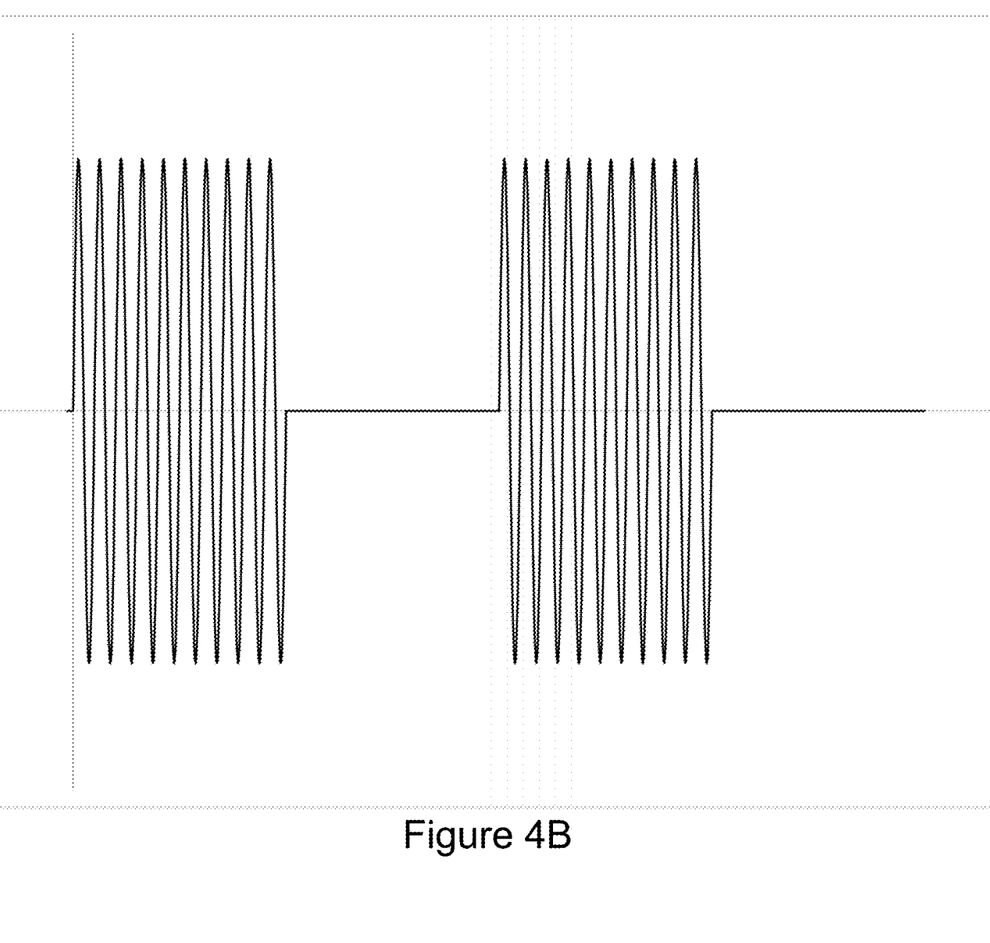
Figure 4C:
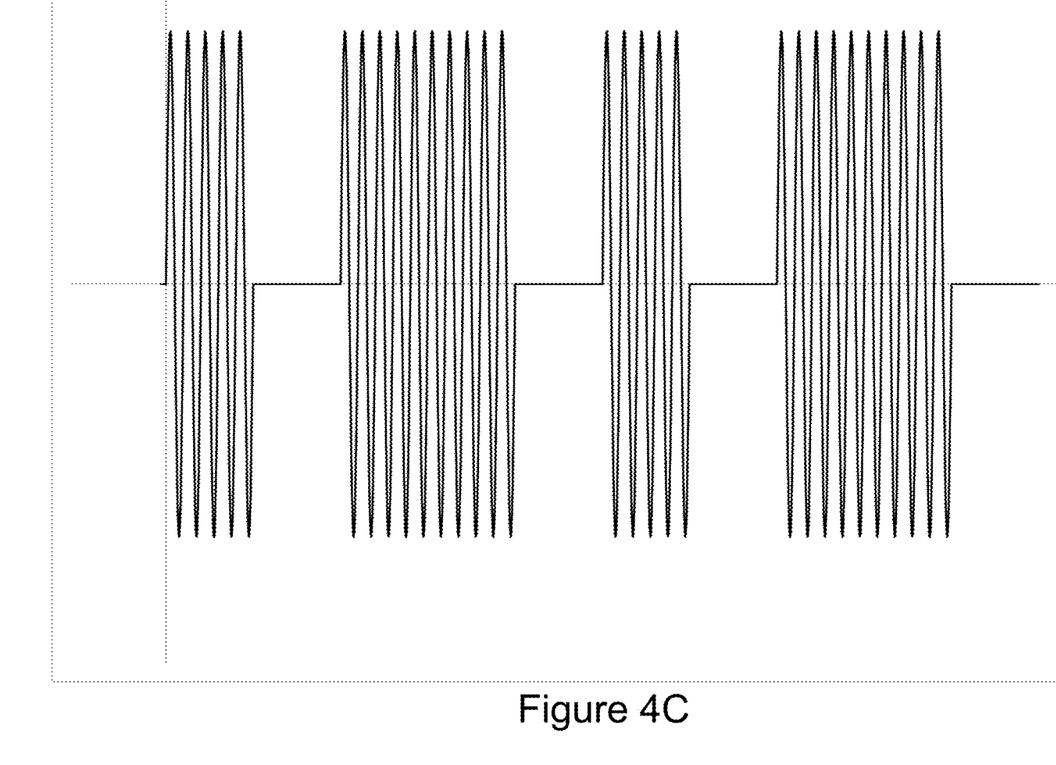
Figure 4D:
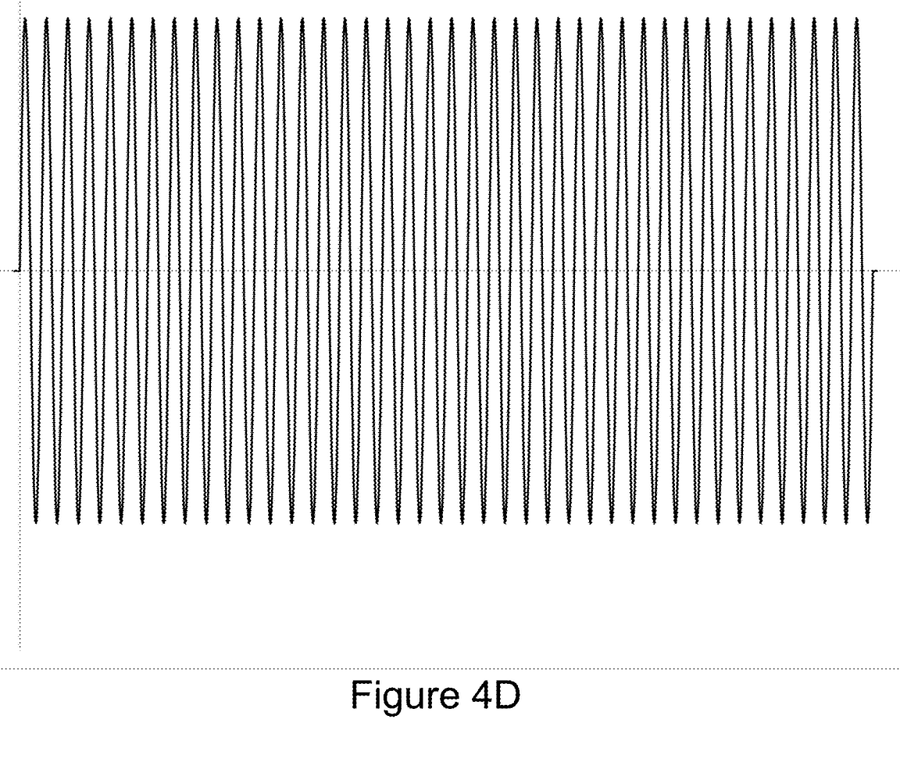
Figure 4E:
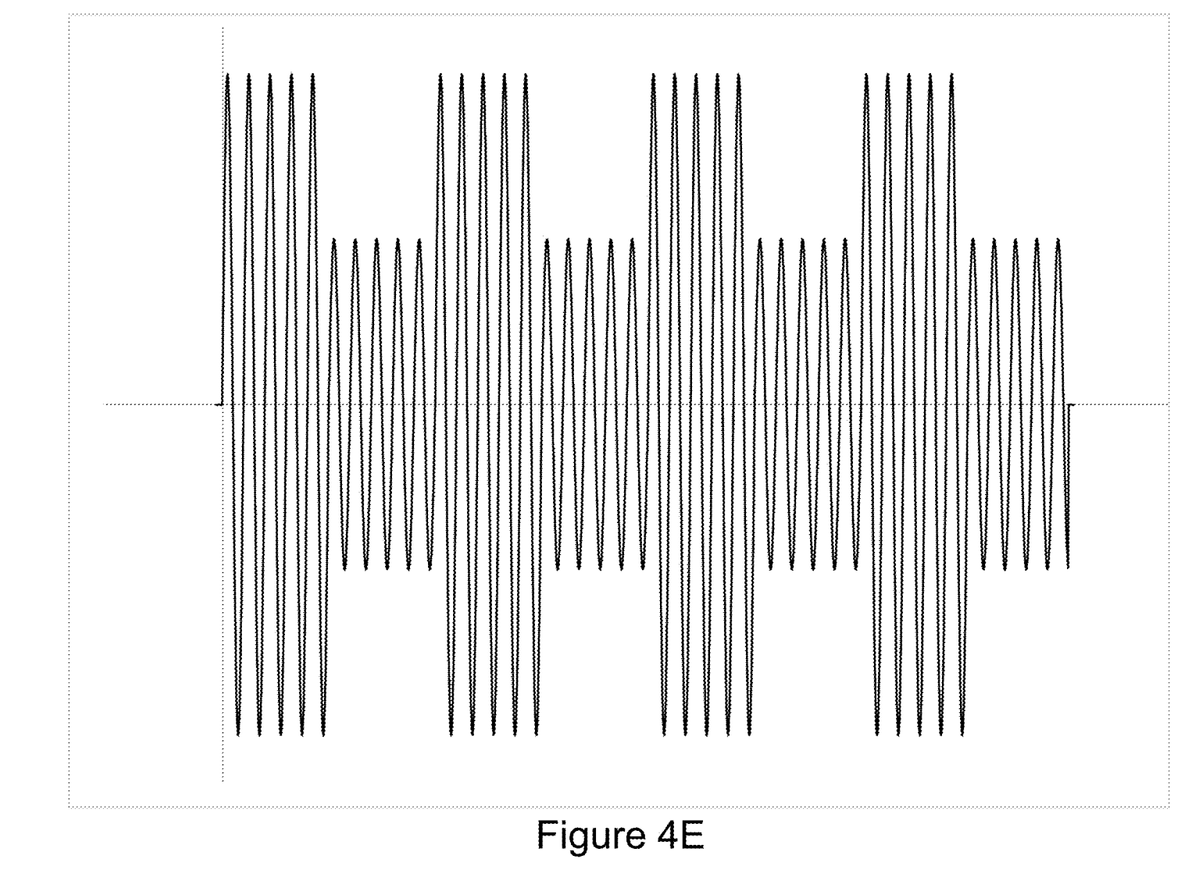
Figure 4F:
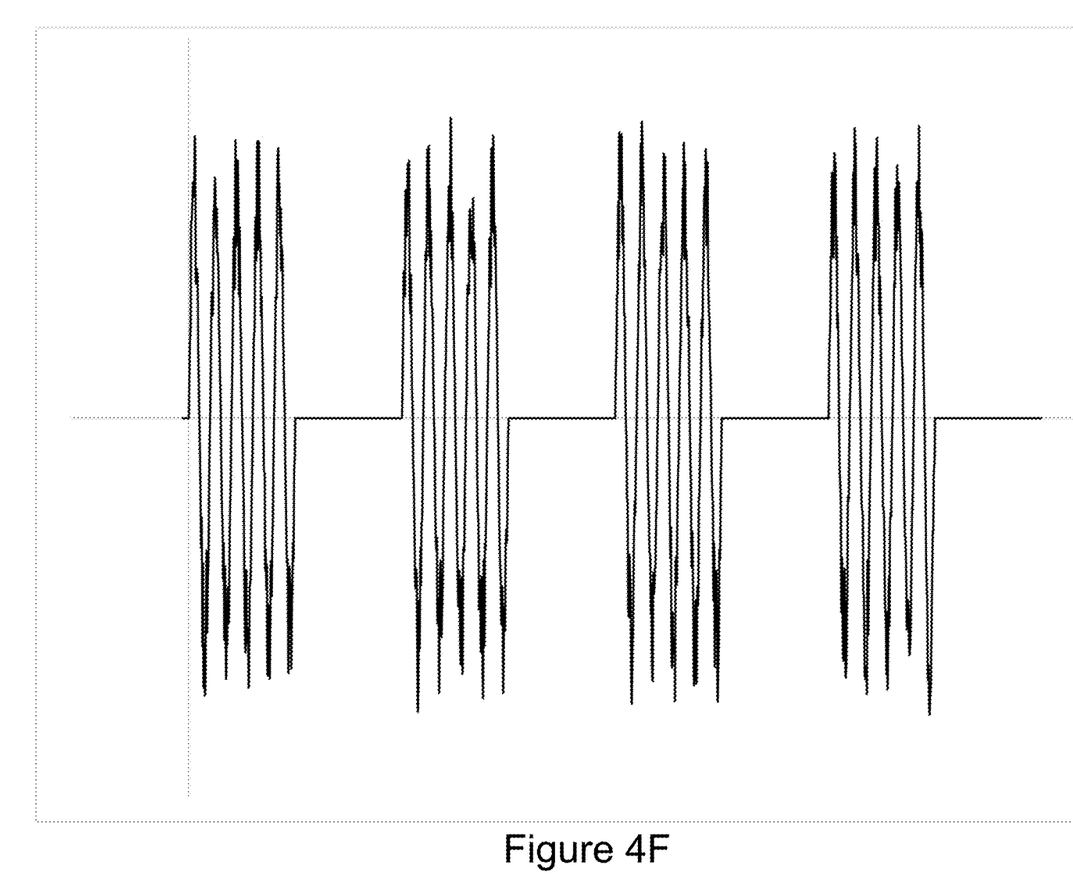

The controller 112 may cause the vibration generation device(s) 140, 142 to generate vibrations according to predetermined patterns that correspond to respective aspects, components, systems, subsystems, devices, functions, and/or combinations thereof, of vehicle 100. FIGS. 4A to 4D schematically illustrate a variety of vibration patterns that may be generated by vibration generation device(s) 140, 142. In FIGS. 4A to 4D, the abscissa corresponds to time, and the ordinate corresponds to amplitude of the vibrations generated by the vibration generation device(s) 140, 142. For example, as illustrated in FIG. 4A, the vibration generation device(s) 140, 142 may generate a sequence of short periods of vibration, followed by short pauses. These periods of vibration and pauses may be of equal or unequal length. As illustrated in FIG. 4B, the vibration generation device(s) 140, 142 may generate a sequence of longer periods of vibration, e.g., longer than those illustrated in FIG. 4A, followed by longer pauses, e.g., longer than those illustrated in FIG. 4A. These periods of vibration and pauses may also be of equal or unequal length. As illustrated in FIG. 4C, the vibration generation device(s) 140, 142 may generate a sequence of a short period of vibration, followed by a pause, followed by a long period of vibration, followed by a pause. The duration of the short period of vibration may be the same or similar to that illustrated in FIG. 4A, the duration of the long period of vibration may be the same or similar to that illustrated in FIG. 4B, and/or the duration of the pause(s) may be the same or similar to the duration of the short or long periods of vibration or may be longer or shorter than the duration of the short or long periods of vibration. As illustrated in FIG. 4D, the vibration generation device(s) 140, 142 may generate a continuous period of vibration. As illustrated in FIG. 4E, the vibration generation device(s) 140, 142 may generate vibrations at different amplitudes, and, as illustrated in FIG. 4F, the vibration generation device(s) 140, 142 may generate vibrations with a varying, e.g., random, amplitude.

To provide an indication to the driver or operator of the vehicle 100 that the vehicle is in condition to be driven, e.g., armed and in an idle condition, a continuous high frequency/low amplitude vibrations may be generated by the vibration generation device(s) 140, 142. Once a predetermined speed, e.g., 2 mph, is reached and/or exceeded, the vibration generation device(s) 140, 142 may be turned OFF. Thus, for example, the continuous high frequency/low amplitude vibrations may be generated during the low-speed mode described, for example, in U.S. patent application Ser. No. 17/518,567, which is expressly incorporated herein in its entirety by reference thereto.

It should be appreciated that vibration generation device(s) 140, 142 may generate vibrations or patterns thereof at predetermined lengths, amplitudes, pitches, frequencies, combinations thereof, etc., and based on the vibration pattern, the driver or operator of vehicle 100 can distinguish between or among the priority and/or importance of the alert, message, signal, etc., corresponding to the particular aspect, component, system, subsystem, device, function, and/or combination thereof associated with the alert, message, signal, etc. For example, a sequence of short vibration pulses and pauses may indicate an incoming phone call on mobile device, e.g., smartphone, connected to vehicle 100 via a Bluetooth connection, a sequence of long vibration pulses and pauses may indicate that periodic maintenance of the vehicle 100 is due, a sequence of rapid vibration pulses and pauses may indicate that the charge level of battery 110 is low, and a continuous vibration may indicate a critical status or alert message demanding the driver's immediate attention. Since the vibration generation device(s) are connected to the handlebar 144, the driver or operator of vehicle 100 can sense the generated vibrations by their hands on the handgrips of the vehicle 100 and can distinguish between or among the various vibration patterns generated by the vibration generation device(s) and thereby receive meaningful feedback on operation, status, aspects, etc., of the vehicle 100 and its components, systems, subsystems, devices, functions, and/or combinations thereof.

Since vibration generation device(s) 140, 142 may be provided on either or both sides of the handlebar 144, it is possible to provide vibrations on an associated side of the vehicle 100. For example, the vibration generation device 140, located in the left-side switchgear 114, may generate vibrations, or a particular, e.g., predetermined, pattern of vibrations upon the driver signaling a left-hand turn utilizing the turn signal control switch of the controls 116 on the switchgear 114, whereas the vibration generation device 142, located in the right-side switchgear 118, may generate vibrations, or a particular, e.g., predetermined, pattern of vibrations upon the driver signaling a right-hand turn utilizing the turn signal control switch of the controls 116 on the switchgear 114. Upon operation of the hazard warning flasher switch of the controls 116 on the switchgear 114, both vibration generation devices 140, 142 may generate vibrations, e.g., synchronously, asynchronously, alternatingly, etc.

Figure 5:
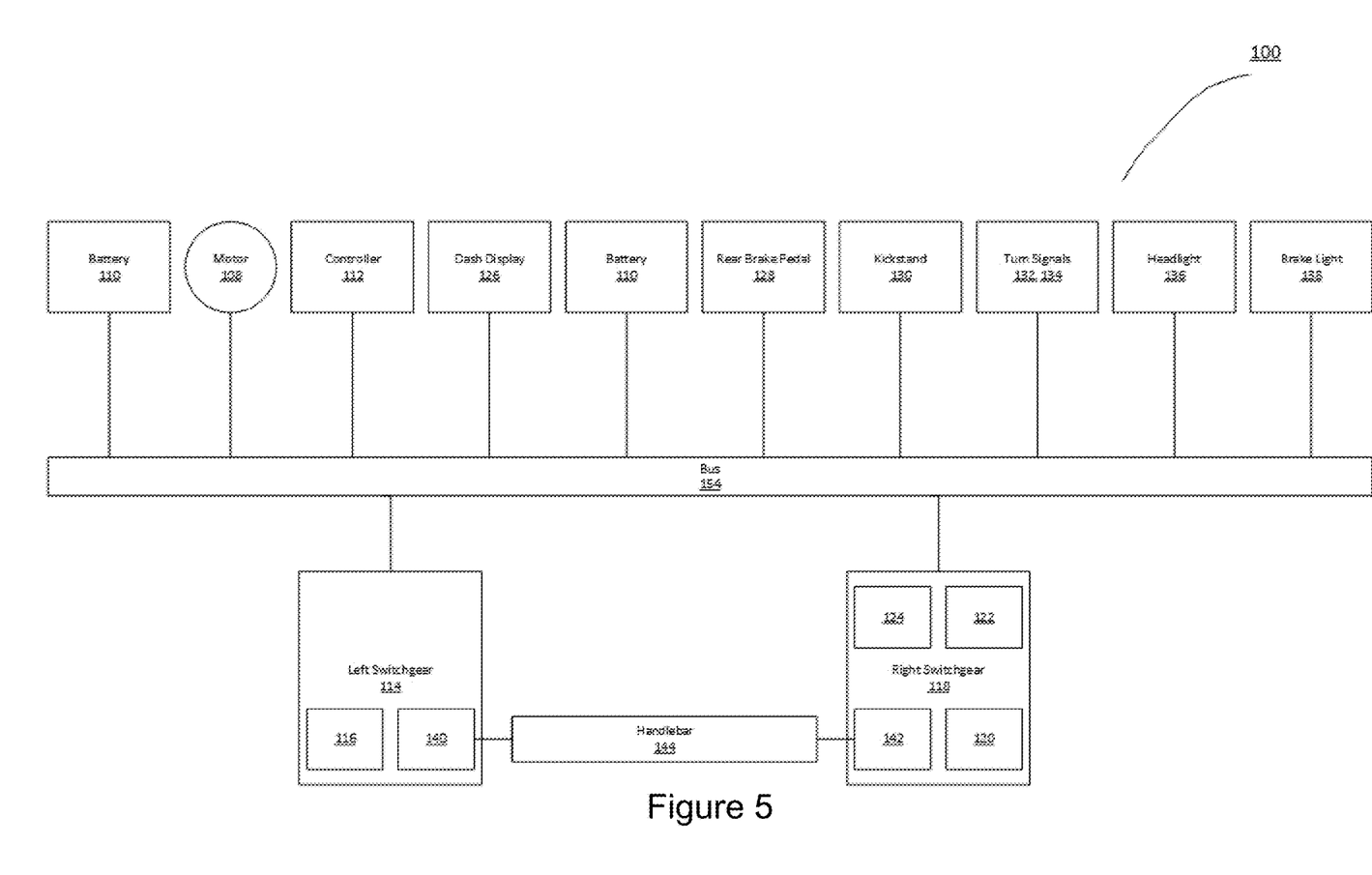
FIG. 5 schematically illustrates components of the vehicle.

As schematically illustrated in FIG. 5, for example, vehicle 100 includes a bus 154, e.g., a CAN bus, for communication among components of the vehicle 100, including, for example: motor 108; battery 110; controller 112; switchgear(s) 114, 118; control(s) 116, 120; accelerator/throttle 122; front brake lever 128; kickstand 130 or a switch that indicates the position of the kickstand 130; dash display 126; rear brake pedal 128; turn signals 132, 134; headlight 136; brake light 138; vibration generation device(s) 140, 142; etc. Bus 154 may include communication line(s), line(s) to supply power from battery 110 to the components of the vehicle 100, wiring harness(es), etc. Thus, the controller 112 may communicate with the components of the vehicle 100 and, depending on their status, activation, deactivation, warnings, operation, errors, alerts, etc., cause vibration generation device(s) 140, 142 to generate vibrations or patterns of vibration to haptically, e.g., tactilely, communicate the same to the driver or operator of the vehicle.

The controller 112 may cause the vibration generation device(s) 140, 142 to generate vibrations based on, for example, the state of charge (SoC) of the battery 110, e.g., fully charged, low charge, discharged, etc., wear of brake pads, tire pressure, energized state of motor 108, e.g., a heartbeat, switching between low and high beam headlights 136, activation and/or deactivation of turn signals 132, 134, activation and/or deactivation of hazard lights, position of accelerator/throttle 122, blind spot detection, lane change or departure detection, driving mode, switching between or among driving modes, service due, incoming telephone calls, text messages, remote communication, driving directions, navigation messages, activation of traction control features, wheel slip, activation of antilock brake systems, status of kickstand, brake fluid level, coolant temperature, motor temperature, battery temperature, connection and/or disconnection of charging equipment, status or operation of ignition switch, status or operation of motor start-stop switch, remaining range on current battery charge, e.g., less than a predetermined number of miles, vehicle operation efficiency, distance traveled, RUN state entered, RUN state exited, success and/or failure of ride mode change, success and/or failure of traction control system mode change, top speed reached, speed limit exceeded, stability control system activated, activation and/or deactivation of heated grips, pairing of a mobile device, e.g., a mobile phone, smartphone, etc., via, e.g., Bluetooth, uploading of log or other information to a remote server, firmware update availability, status, completion, etc., change of settings performed via dash display 126, navigation through the menu system or user interface of the dash display 126, e.g., warnings, faults, alarms, alerts, status, messages, etc., displayed on dash display 126, regenerative braking, etc. For blind spot detection and/or lane change or departure detection, only the vibration generation device 140, 142 located on the relevant side of the vehicle 100 may be activated to generate vibrations, to thereby alert the driver or operator of the vehicle 100 as to the relevant side of the vehicle 100. For example, in the circumstance that a hazard is detected in the blind spot of the vehicle 100 on the right-hand side, only the vibration generation device 142 is activated to generate vibrations. As another example, when changing lanes and/or making a turn at an intersection, the vibration generation device 140, 142 located on the relevant side of the vehicle 100 may be activated and/or deactivated in accordance with activation and/or deactivation of turn signal 132, 134. In connection with the turn signals 132, 134, one pattern may be generated upon activation and another, e.g., different, pattern may be generated upon deactivation and/or automatic cancelation of the turn signal 132, 134. For example, the vehicle 100 may include a turn signal cancelation system, such as those described, for example, in U.S. patent application Ser. No. 17/489,211, which is expressly incorporated herein in its entirety by reference thereto, and the vibration generation devices 140, 142 may generate vibrations based on activation, deactivation, and/or automatic cancelation of turn signals utilizing the turn signal cancelation system.

In addition to inducing vibrations in handlebar 144 that may be tactilely detected or sensed by the driver or operator of vehicle 100, the vibrations generated by the vibration generation device(s) 140, 142 may be of sufficient frequency, amplitude, pitch, duration, etc., to be sensed, e.g., audibly, by pedestrians in the vicinity of the vehicle 100. Additionally or alternatively, the vehicle 100 may provide audible and/or visual signals, by, for example, buzzers, speakers, horns, lamps, lights, LEDs, etc., simultaneously to the operation of the vibration generation device(s) 140, 142. Thus, pedestrians may become more aware of the presence of vehicle 100, its operation, and/or its potential operation since electric vehicles, plug-in hybrid vehicles, hybrid vehicles operating on battery power, etc., are typically quiet or substantially silent. By providing a heart-beat signal, e.g., a periodic pulse of vibrations, while the vehicle 100 is in the RUN state, the driver, operator, passenger, and nearby pedestrians may be alerted that the vehicle 100 is in a live state and reduce the possibility of unintentional acceleration of the vehicle 100.

Figure 6:
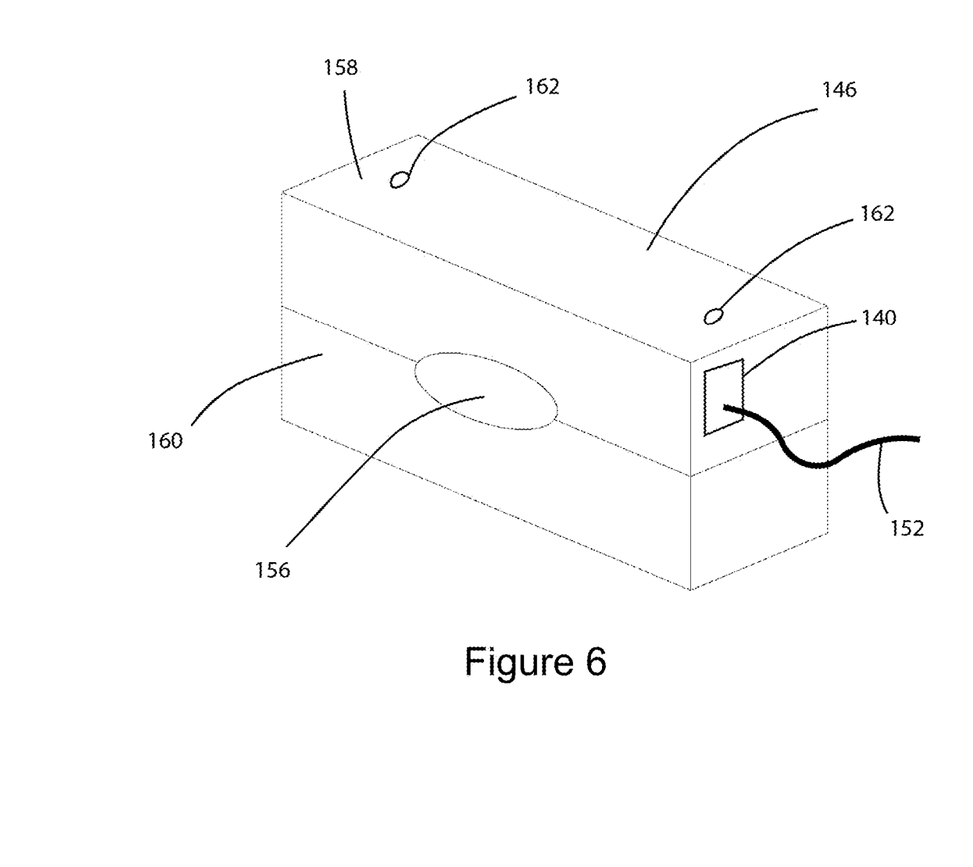
FIG. 6 is a schematic perspective view of a clamp mechanism for connecting the vibration generation device to a handlebar of the vehicle.

As mentioned above, the vibration generation devices 140, 142 may be connected to a clamp mechanism for clamping the respective switchgear 114, 118 to the handlebar 144 so that vibrations, or patterns thereof, generated by the vibration generation devices 140, 142 are effectively transmitted to the handlebar 144 and to the driver or operator of the vehicle 100. FIG. 6 is a schematic perspective view of such a clamp mechanism 146. The clamp mechanism 146 may be an integral portion of switchgear 114, 118 or may be separate therefrom. The clamp mechanism 146 includes two halves 158, 160 that may be urged toward each other by screws 162 so that the clamp mechanism 146 and switchgear 114, 118 are secured to handlebar 144 located therebetween and passing through opening 156. The vibration generation device 140 (or 142) may be secured to or embedded in the clamp mechanism 146 so that vibrations generated by the vibration generation device 140 are transmitted to the clamp mechanism 146, from the clamp mechanism 146 to the handlebar 144, and from the handlebar 144 to the driver or operator of the vehicle. The vibration generation device 140 (or 142) may be integral with the clamp mechanism 146 or a portion thereof, e.g., one of the halves 158, 160. For example, a housing of the vibration generation device 140 may correspond to one of the halves 158, 160.

While vibration generation devices 140, 142 are described as being connected to the handlebar 144 to transmit vibrations to the driver or operator of the vehicle 100, it should be appreciated that additional vibration generation devices may be included in the vehicle 100, e.g., in the seat 106, in foot pegs, etc., to provide further haptic or tactile feedback to the driver, operator, and/or passenger of the vehicle 100. Additionally, vibration generation device(s) 140, 142 may be included in a housing that it attached to and/or provided in the switchgear(s) 114, 118, so that vibrations generated by the vibration generation device(s) 140, 142 are transmitted to the switchgear(s) 114, 118, to the handlebar 144, and ultimately to the driver or operator of the vehicle 100.

While vehicle 100 is described as a two-wheeled vehicle, it should be appreciated that vehicle 100 may be arranged as any vehicle having a vibration generation device(s) located in the switchgear, steering column, steering wheel, or other location in the vehicle, to provide alerts and/or other feedback to the rider, driver, and/or passenger(s). For example, the vehicle 100 may be arranged as an all-terrain vehicle (ATV), a side-by-side, an off-road vehicle (ORV), a quad vehicle, a snowmobile, a three-wheeler, a powersports vehicle, automobile, golf cart, forklift, etc.

What is claimed is:

1. A switchgear for a vehicle, comprising:
    a housing delimiting an internal space;
    a control device manually operable by an operator of the vehicle, provided on the housing, and adapted to control a corresponding component of the vehicle external to and spaced apart from the housing;
    a vibration generation device arranged inside the internal space of the housing and adapted to generate vibrations according to a predetermined pattern associated with the corresponding component of the vehicle external to and spaced apart from the housing; and
    a clamp device adapted to clamp the housing to a handlebar of the vehicle, the vibration generation device being mechanically coupled to the clamp device and adapted to transmit the generated vibrations to the clamp device, the clamp device adapted to transmit, to the handlebar, the vibrations generated by the vibration generation device and transmitted to the clamp device.

2. The switchgear according to claim 1, wherein the clamp device is adapted to clamp the housing directly to the handlebar.

3. The switchgear according to claim 1, wherein the control device includes a plurality of control devices, each control device adapted to control a corresponding component of the vehicle external to and spaced apart from the housing.

4. The switchgear according to claim 1, wherein the vibration generation device is directly coupled to the clamp device without any vibration damping or vibration isolation device between the vibration generation device and the clamp device.

5. The switchgear according to claim 3, wherein the vibration generation device is adapted to generate vibrations according to a plurality of predetermined patterns, each predetermined pattern being associated with a respective one of the plurality of control devices.

6. The switchgear according to claim 1, wherein the vibration generation device includes an eccentric rotating mass.

7. The switchgear according to claim 1, wherein the vibration generation device includes a piezoelectric vibration generation device.

8. The switchgear according to claim 1, wherein the control device includes a switch.

9. The switchgear according to claim 1, wherein the control device includes a momentary switch.

10. The switchgear according to claim 1, wherein the control device includes a turn signal switch, a headlight switch, a brake lever, and/or an accelerator.

11. The switchgear according to claim 1, wherein the vehicle includes an electric drivetrain.

12. A vehicle, comprising:
a handlebar; and
a switchgear mounted to the handlebar and including:
a housing delimiting an internal space;
a control device manually operable by an operator of the vehicle, provided on the housing, and adapted to control a corresponding component of the vehicle external to and spaced apart from the housing;
a vibration generation device arranged inside the internal space of the housing and adapted to generate vibrations according to a predetermined pattern associated with the corresponding component of the vehicle external to and spaced apart from the housing; and
a clamp device clamping the housing to the handlebar, the vibration generation device being mechanically coupled to the clamp device and adapted to transmit the generated vibrations to the clamp device, the clamp device adapted to transmit, to the handlebar, the vibrations generated by the vibration generation device and transmitted to the clamp device.

13. The vehicle according to claim 12, wherein the clamp device clamps the housing directly to the handlebar.

14. The vehicle according to claim 12, wherein the control device includes a plurality of control devices, each control device adapted to control a corresponding component of the vehicle external to and spaced apart from the housing.

15. The vehicle according to claim 12, wherein the vibration generation device is directly coupled to the clamp device without any vibration damping or vibration isolation device between the vibration generation device and the clamp device.

16. The vehicle according to claim 14, wherein the vibration generation device is adapted to generate vibrations according to a plurality of predetermined patterns, each predetermined pattern being associated with a respective one of the plurality of control devices.

17. The vehicle according to claim 12, wherein the vibration generation device includes an eccentric rotating mass.

18. The vehicle according to claim 12, wherein the vibration generation device includes a piezoelectric vibration generation device.

19. The vehicle according to claim 12, wherein the control device includes a switch.

20. The vehicle according to claim 12, wherein the control device includes a momentary switch.

21. The vehicle according to claim 12, wherein the control device includes a turn signal switch, a headlight switch, a brake lever, and/or an accelerator.

22. The vehicle according to claim 12 wherein the vehicle includes an electric drivetrain.

23. The vehicle according to claim 12, wherein the vehicle includes a first switchgear arranged on a first lateral side of the handlebar and a second switchgear arranged on a second lateral side of the handlebar.

* * * * *